Patented Feb. 25, 1930

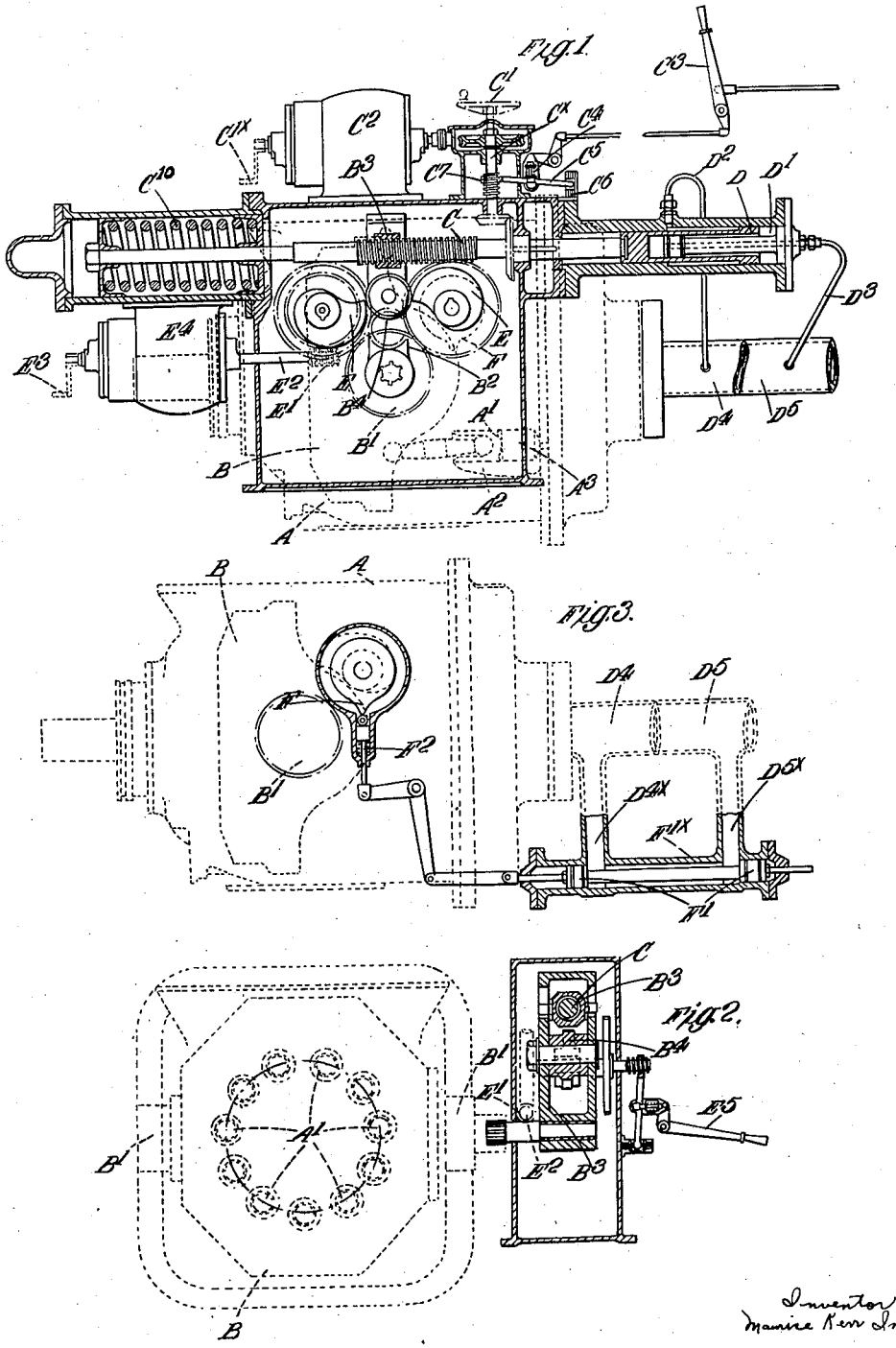

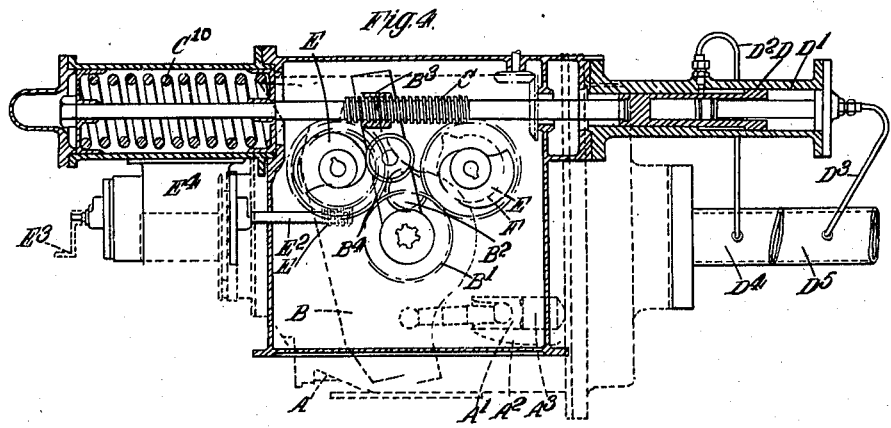

1,748,606

UNITED STATES PATENT OFFICE

MAURICE KERR INGOLDBY, OF WESTMINSTER, ENGLAND, ASSIGNOR OF ONE-HALF TO THE VARIABLE SPEED GEAR LIMITED, OF WESTMINSTER, ENGLAND, A BRITISH COMPANY

VARIABLE-DELIVERY PUMP

Application filed September 5, 1928, Serial No. 304,079, and in Great Britain October 5, 1927.

This invention relates to variable delivery pumps having one or more pistons and an adjustable member (herein termed the stroke-imparting member) for imparting reciprocatory movement to the piston or pistons to vary the delivery, the pump delivering liquid under pressure to one or more motors of any suitable type such as the ram, multi-piston or vane type.

In such pumps the said stroke-imparting member is usually placed under the dual influence of a hand-operated or hand-controlled device and an automatic device responsive to variations of pressure in the liquid delivered by the pump with the result that for any given setting of the former device the position of the stroke-imparting member does not necessarily correspond with that setting as the automatic device may have moved the said member considerably from the position to which it has been set by hand. This leads to difficulties in the control of the motor, particularly when the load on the latter is constantly varying and when it is rotating slowly, since when the operator desires to take control by means of the hand-operated or hand-controlled device, after the automatic control device has moved the stroke-imparting member as a result, for example, of a considerable rise in the pressure of the liquid, he has to move the former device through an unknown and variable distance before he can move the said member.

According to the present invention the above-mentioned difficulty is obviated by providing in addition to the aforesaid hand-operated or hand-controlled device and the aforesaid automatic device, an independent adjustable stop or adjustable stops for limiting the movements of the stroke-imparting member on one or both sides of its neutral or "no-stroke" position according as to whether the pump is intended to deliver liquid in one direction only or in one direction or the other as required, the position to which the stop (or stops) is adjusted determining the maximum stroke of the pump piston or pistons it is desired to allow under given conditions, whilst the adjustment of the hand-operated or hand-controlled device associated with the automatic device determines the direction of movement of the stroke-imparting member. Consequently when the stop or stops are moved by a hand-operated control member (either directly or through a servo-motor controlled by this member) for starting the machinery driven by the motor, the stroke-imparting member will be under the sole control of the automatic device and as a result there will be a gradual acceleration of the motor, depending upon the load to be overcome, from zero to the speed determined by the setting of the said control member which is herein termed the speed control member to distinguish it from the control member of the aforesaid hand-operated or hand-controlled device, which latter member is herein termed the direction control member. By reason of our improvements we are also able by a simple manipulation of the speed control member to cause the motor to move at any required speed. It will be understood that as the speed control member is entirely disassociated from the automatic device, the position of this control member is a correct representation of the ultimate position to be assumed by the stroke-imparting member after acceleration of the driven machinery has ceased and therefore is a correct representation of the ultimate speed of the said machinery, which is of considerable benefit to the operator in controlling the machinery.

In conjunction with the said stop or stops there may be provided a cam or other device which, in the position of the said stop or stops holding the stroke-imparting member against movement from the neutral position, operates a valve which short-circuits the pressure and suction conduits of the pump and thus prevents any possibility of the motor unit "creeping" owing to a slight amount of pressure liquid being supplied to the motor unit by the pump unit if the stroke-imparting member is not in exactly the neutral position. The said stop (or each of the said stops) may be in the form of cams and it or one of them may carry the cam for operating the short-circuiting valve.

When two cams or other stops are employed they may be suitably geared together so that they move simultaneously towards or away from the part of the stroke-imparting member with which they co-operate.

In order that the said invention may be clearly understood and readily carried into effect, the same will now be described more fully with reference to the accompanying drawings, in which:—

Figure 1 is a diagrammatic side elevation showing a form of the invention with the parts in the position they occupy when the speed control member is in the neutral or no-stroke position and the direction control members is in the "forward" position, Figure 2 is a sectional end elevation of Figure 1, Figure 3 is a view similar to Figure 1 showing the short-circuiting valve and the parts associated therewith, and Figures 4, 5 and 6 are views similar to Figures 1, 2 and 3 respectively showing the parts in different positions as will be hereinafter described.

In the drawings the parts that are relevant to the present invention are shown in full lines and the other parts are shown in broken lines.

A is the casing of a pump unit of the well known Williams-Janney type which has a number of pistons (one of which is shown at $A^1$ in Figure 1) disposed parallel to and concentrically around the axis of a body $A^2$ formed with cylinders $A^3$ in which these pistons work, reciprocatory motion being imparted to the pistons by a member B which is adjustable on trunnions $B^1$ so as to vary the stroke of the pistons and is termed the tilting box. This tilting box, which in the example shown can be moved to one side or the other of its neutral position, has an arm or lever $B^2$ carrying a nut $B^3$ which receives a screw-threaded shaft C. This shaft is connected to a shaft $C^x$ by bevel wheels $C^8$ and $C^9$, the former of which is so mounted on the shaft C, as by means of a feather (not shown), that it can move axially on, but must rotate with, the shaft. The shaft $C^x$ carries a worm wheel meshing with a worm on the armature shaft of a reversible servo-motor $C^2$ controlled by a lever $C^3$ (or a hand wheel) which operates through a spring $C^4$ upon a floating lever $C^5$. At one end this floating lever carries a contact forming part of an electrical reversing device (indicated generally at $C^6$) for the servo-motor $C^2$ and at the other end the said floating lever is pivoted to a nut $C^7$ engaging with screw threads on the shaft $C^x$. This arrangement of parts constitutes a hunting gear serving as is well understood to return the floating lever $C^5$ to the neutral position to bring the servo-motor $C^2$ to rest when it has rotated the shaft C to the full extent in the direction corresponding to that in which the lever $C^3$ has been moved.

In the event of failure of the electrical power the shaft $C^x$ can be rotated by hand by means of a crank $C^{1x}$ detachably connected to the armature shaft of the servo-motor $C^2$ and alternatively, when the servo-motor is not provided, the shaft $C^x$ can be rotated by a hand wheel $C^1$ attached thereto. The member $C^1$, $C^{1x}$ or $C^3$ constitutes the aforesaid direction control member.

The screw-threaded shaft C carries at one end a double-acting ram D disposed in a cylinder $D^1$ the ends of which are connected by pipes $D^2$, $D^3$ to the pressure and suction conduits $D^4$, $D^5$ of the pump unit, and the axial movements of the said shaft C under the influence of the ram D are opposed by a double-acting spring $C^4$. The said ram and spring constitute the aforesaid automatic device for varying the position of the tilting box in accordance with the pressure of the liquid. The said arm or lever $B^2$ carries a roller $B^4$ for co-operating with two oppositely arranged cams E, E constituting the aforesaid stops, these cams being geared together so that they move simultaneously towards or away from the roller $B^4$. The said cams are angularly displaced by a worm $E^1$ on a shaft $E^2$ which is rotated by a servo-motor $E^4$ controlled by a lever (or hand wheel) $E^5$ (Figure 2) in a similar manner to that described above with reference to the lever $C^3$, or the said shaft $E^2$ is rotated by hand by means of a crank handle $E^3$ detachably connected to the armature shaft of the servo-motor $E^4$, the crank handle $E^3$ or the lever $E^5$ constituting the aforesaid speed control member. One of the said cams E, E carries another cam F which, in the position of the cams E, E holding the tilting box B against movement from its neutral position as shown in Figure 1, moves a valve $F^1$ (Figure 3) against the resistance of a spring $F^2$, into the position shown in Figure 3 to short-circuit the pressure and suction conduits $D^4$, $D^5$ through the branch pipes $D^{4x}$, $D^{5x}$ and the cylinder $F^{1x}$ in which the said valve is disposed.

The operation is as follows:—While the arm $B^2$ is held by the cams E, E in the neutral position the direction control member $C^1$, $C^{1x}$ or $C^3$ is moved to a position corresponding to either "forward" or "reverse" travel thereby rotating the screw-threaded shaft C of the double-acting ram D. As this shaft engages in the nut $B^3$ carried by the arm $B^2$ which is held between the cams E, E, it moves axially, thereby compressing the spring $C^{10}$ which tends to move the arm $B^2$ to take up a position corresponding to the full stroke position of the tilting box B. In Figure 1 the lever $C^3$ is shown moved to the "forward" position, the spring $C^{11}$ being compressed as described above. The arm $B^2$ is still held in the neutral position by the cams E, E and Figure 2 shows the valve $F^1$ held in the open position by the cam F. If then the speed control member $E^3$ or $E^5$ is moved (thereby angularly displacing the cams E, E) any degree of piston stroke can be obtained by permitting the arm $B^2$ to move under the action of the spring $C^{11}$, as it will then retain contact with the appropriate cam unless a pressure is experienced which is sufficient to cause the ram D to compress the spring $C^{11}$ and thereby return the arm $B^2$ to some intermediate position out of contact with the cam. The cams E, E are so arranged that the working face of each cam recedes from the arm $B^2$ as the cams are moved to the high speed position.

Figure 4 shows the position of the cams E, E and the arm $B^2$ after the speed control member $E^3$ or $E^5$ has been moved to the full speed position, whilst Figure 6 shows the valve $F^1$ in the closed position determined by the spring $F^2$ and the cam F.

The above described apparatus is intended for any purpose where accurate "inching" (i. e. movements at very low speed) at high loads is required, together with completely automatic and unskilled acceleration. The apparatus is completely safeguarded so far as pressure is concerned, and in addition gives control by two members, one for "forward" and "reverse", (i. e. the direction control member $C^1$, $C^{1x}$ or $C^3$) the other (i. e. the speed control member $E^3$ or $E^5$) for full or intermediate speeds and stop, which is consistent with normal practice for such machinery.

Instead of the cams E, E other stops, such as reciprocatory members, may be employed and suitably moved in opposite directions by the operation of the speed control member $E^3$ or $E^5$.

The motor unit supplied with liquid under pressure from the pump unit above described may be similar in construction to the pump unit but the stroke controlling member for the pistons of the motor unit is usually arranged at a fixed inclination and is termed the angle box.

Any desired number of pumps may be employed with one or more liquid motors, each of the tilting boxes or other stroke-imparting members of the pumps being controlled in the manner indicated above and the liquid motor or motors may be provided with the features forming the subject of our patent application filed concurrently herewith. When a number of such pumps and motors are required to drive the same machinery, their control devices may be mechanically connected and operated simultaneously or may be independently controlled and the pumps and motors will independently adjust themselves to the load, that is to say the positions of the tilting boxes or other adjustable stroke-imparting members of the pumps will be regulated by their associated automatic devices and the angle boxes or other stroke-controlling members of the liquid motors will be separately placed in their operative positions or displaced to their neutral positions and the motors also protected against over-running. Furthermore as the liquid motors when over-run or relieved from pressure have their angle boxes or other stroke-controlling members returned to the neutral position, one or more of the pumps and motors can be placed out of action without interfering with those that remain in operation.

The herein described improvements are particularly intended for use in driving locomotives from a Diesel engine or other prime mover, but can be used for driving other machinery where simplicity and certainty of control of speed are desirable.

What I claim and desire to secure by Letters Patent of the United States is:—

1. A variable delivery pump of the kind provided with a stroke-imparting member under the dual influence of a hand-operated or hand-controlled device and an automatic device responsive to variations of pressure in the liquid delivered by the pump, wherein an adjustable stop or adjustable stops independent of the said controlling device is or are provided for limiting the movements of the stroke-imparting member on one or both sides of its neutral or "no-stroke" position according as to whether the pump is intended to deliver liquid in one direction only or in one direction or the other as required, the position to which the stop (or stops) is adjusted determining the maximum stroke of the pump piston or pistons it is desired to allow under given conditions, whilst the adjustment of the hand-operated or hand-controlled device associated with the automatic device determines the direction of movement of the stroke-imparting member.

2. A variable delivery pump as in claim 1, wherein the stop, or each of the stops, is in the form of a cam mounted on a spindle, the said spindles, in the case in which there are two stops, being geared together to produce simultaneous motion of the cams, whereby the movements of the stroke imparting member on either side of the neutral position are equally limited.

MAURICE KERR INGOLDBY.